Nov. 14, 1939.  L. S. FRAPPIER ET AL  2,179,550
FILM SPROCKET
Filed Aug. 8, 1936
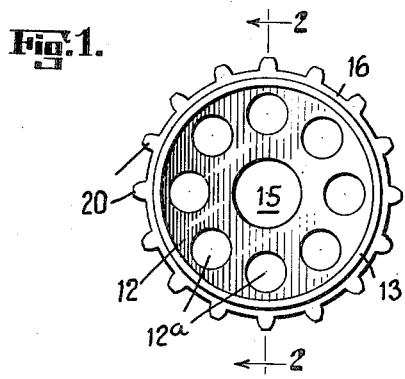
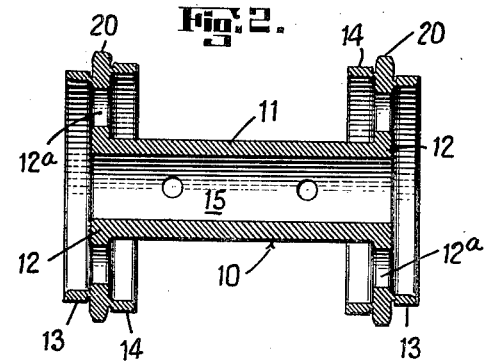
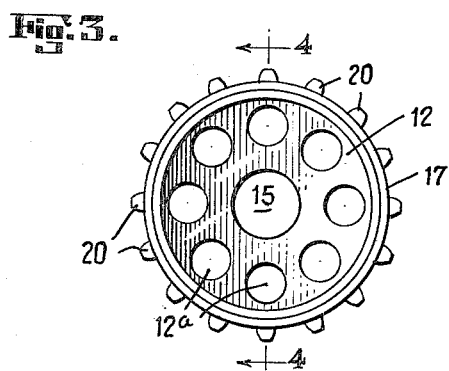
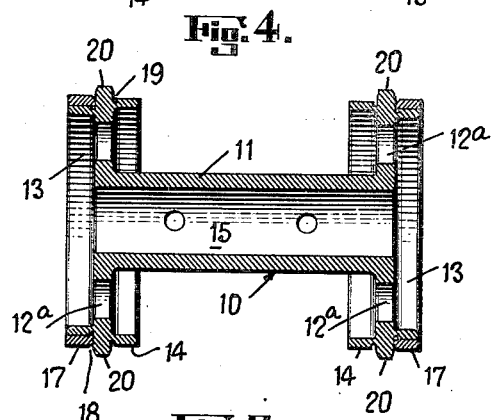
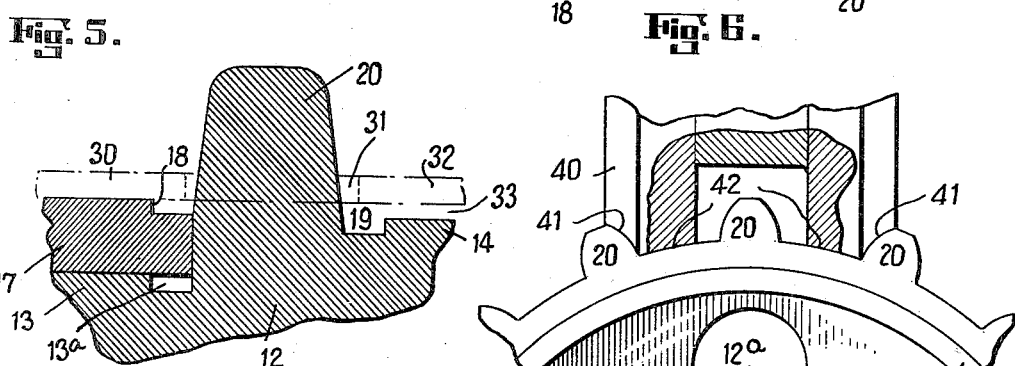
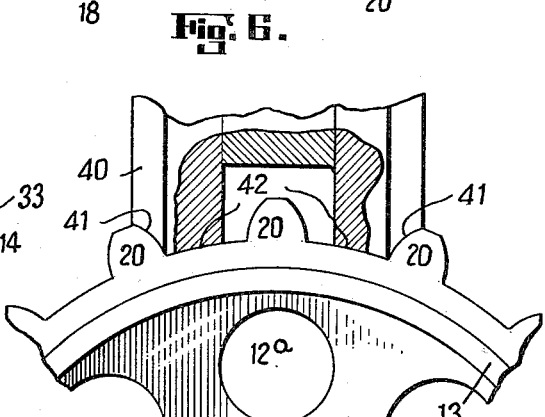
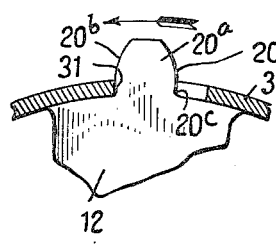
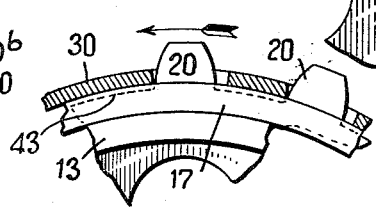
INVENTOR
Louis S. Frappier
BY Albert Kindelman
Emery, Varney, Whitemore & Dix
ATTORNEYS Patented Nov. 14, 1939

2,179,550

UNITED STATES PATENT OFFICE 2,179,550

FILM SPROCKET

Louis S. Frappier, New York, and Albert Kindelmann, Floral Park, N. Y., assignors to International Projector Corporation, New York, N. Y., a corporation of Delaware Application August 8, 1936, Serial No. 94,904

8 Claims. (Cl. 74—243)

This invention relates, in general, to sprockets and more particularly to sprockets for moving the film through a motion picture apparatus.

In a prior patent of Augusto Dina No. 1,850,830 of March 22, 1932, there has been disclosed an improved film sprocket including means incorporated or formed therein for mitigating or doing away with the sharp edges of the teeth that tore the film at the sprocket holes. This improved sprocket prevented, to a very considerable extent, the tearing of the films at the sprocket holes, and it acted also to release or free the dirt that would normally collect around the teeth.

The improvements of the present invention comprehend additional features of novelty relating to the improved sprocket herein, among which features may be noted the provision of separate bearing surfaces or members for the film; the arrangement of the film-bearing members with respect to the teeth of the sprocket to cause engagement of the film at the sprocket holes by the teeth at points above the roots of the teeth and thereby insure uniform engagement of the teeth with the film; and the improved method steps of forming the improved film sprockets.

Other features of novelty include the provision of spaces on non-bearing, inner drum sections to strengthen the drums, and so arranged as to prevent any bearing contact with the inner portions of the film, and more particularly of the sound tracks thereon, thereby eliminating damage to the sound track or to other parts of the film.

Other features of the invention in respect to this improved sprocket may be noted as providing a sprocket of very light weight but of great strength with all the teeth hardened to increase the wear characteristics. Such a novel sprocket will, therefore, serve for a much longer time than sprockets heretofore designed for this purpose.

These improved sprockets may be employed at any of the several places in film-handling apparatus, but they are particularly adapted to be used on the intermittent shaft which starts and stops many times per minute. It is very desirable that these so-called sprockets called "intermittent" sprockets shall be as light in weight as possible and shall have great wearing quality and shall be so designed as to eliminate any cutting, ripping or tearing of the film at the sprocket holes or otherwise. It is also desirable to construct the sprocket so as to eliminate the collecting of dirt on the sprocket at undesirable spots that would cause the film to set unevenly, as it engages the sprocket for quite a number of degrees of an arc of a circle. The improved sprocket herein allows the dirt or other undesirable material to drop into the roots of the teeth and then to drop out, thereby preventing the dirt or undesirable material from raising the film and have it engage other parts of the teeth than the same relative driving points on each tooth.

These and other desirable features and advantages which are characteristic of this invention, will be particularly pointed out in the description and the claims following. The invention, itself, as to its objects and advantages, the mode of its operation and the manner of its organization, may be better understood by referring to the following description taken in connection with the accompanying drawing forming a part thereof, in which Fig. 1 is an end view of a sprocket drum blank after machining and before application of the film-bearing ring;

Fig. 2 is a vertical section taken on line 2—2 of Fig. 1;

Figs. 3 and 4 are views similar to Figs. 1 and 2 showing the film-bearing rings applied to the outer shoulders of the drums;

Fig. 5 is an enlarged detail of a sprocket tooth and associated film-bearing ring showing the application and bearing of film on the film ring and the provision of annular grooves adjacent the tooth, as well as the spacing of the inner or photo part of the film from the inner shoulder of the drum;

Fig. 6 is a detail of a drum and grinding member showing the method of grinding the teeth of the sprocket.

Fig. 7 is a detail of an old type of sprocket tooth showing undercutting at the root and the gripping or seating of film in the socket so formed; and Fig. 8 is a view similar to Fig. 7 showing the improved sprocket of the invention herein and having the film-bearing ring in place and showing the film raised above the tooth root and in engagement with a tooth at point of uniform curvature where there is no danger of damage to the film.

As intimated hereinabove, and as generally known, particular and profound difficulty is encountered in motion picture operation due to the tearing of the film stock at the sprocket holes. This is due, to some extent, to the inherent nature of the film stock which has relatively low tensile strength and is characterized by an appreciable brittleness, which is evident under conditions where the film material is exposed to jerky motion, as occurs at certain points in motion picture projection machines and cameras.

With the advent of photographically recorded sound on film which is usually positioned adjacent the inner edge of the film sprocket holes at one or both sides of the film, further difficulty has arisen due to the mechanical abrading and wearing of film stock and emulsion. The provision of annular grooves on either side of the teeth and preferably formed integrally in the drum members, does not fully remedy this situation, because of the bearing of the picture or sound track on supporting sections of the sprocket drums.

In the present invention these disadvantages are obviated and done away with by providing improved bearing and supporting means for the films which leave the picture and sound sections without contact with any portions of the drums of the sprocket, yet permit accurate, smooth and easy driving engagement and release of the film sprocket holes from the sprocket teeth without injury.

Considering the invention somewhat more in detail and with particular reference to the showings in the drawing, there is indicated a film sprocket 10 comprising a hub or body portion 11 and perforated end sections or drums 12. An outer flange or annulus 13 may be formed integrally on the outside of the drum and concentric with the hollow hub center 15 of the hub 11. An annular groove 13a may be formed between the flange 13 and the ring or tooth section 16 (Fig. 1). The object of the annular groove 13a is to remove any burr or rounded shoulder between the flange 13 and the outer base of the teeth 20 so that the annulus 17 will not be obstructed and so that it may be moved flush against the base of the teeth without leaving a material gap. The drums 12 may also be provided with inner flanges 14. The end or drum sections 12 may have a ring section 16 extending beyond the annulus or shoulder 13, which ring 16 has sprocket teeth 20 preferably formed integrally therewith, the formation and function of which will be discussed more in detail hereinafter. The outer flange or shoulder 13 has a separate, hardened annulus or ring 17 fastened thereon in any suitable fashion, such as by being shrunk thereon. This ring 17 is provided with a chamfered or angular-shouldered edge 18, preferably forming an annular groove with the adjacent teeth 20 of the film sprocket. A second annular groove 19 may be formed between the inner ring 14 and the teeth 20. These annular grooves function to allow dirt and extraneous particles to fall from the sprocket thus eliminating bumps on the sprocket that would cause the film to lie unevenly on the sprocket and thus start tearing of the film when the sprocket pulls the film.

Normally the flanges 14 perform no function when good film is used but in case the apertures are mutilated on either edge of the film, the flanges 14 tend to support the film and prevent it from bending downwardly towards the hub 11.

The film-supporting annulus or ring 17 is in practice very thin, usually about $\frac{1}{32}''$ in thickness and is shrunk on the ring flange 13 of the drum and, as already noted, has an outside diameter greater than the root diameter of the sprocket teeth and greater than the outside diameter of the inner annulus 14. The centers of these several diameters may be referred to as having a common center which is the center of the hub or aperture 15 of cylinder 11.

Referring more particularly to Fig. 5, it will be noted that a film 30 having film aperture or sprocket hole 31 engaged by the sprocket teeth 20, will be supported on the annulus or ring 17 and that the inner or picture-bearing portion 32 of the film will be spaced and held away from the inner sprocket flange 14 an appreciable distance or gap, designated generally by the numeral 33.

Considering the driving of the films, and as shown in Figs. 7 and 8, it will be noted, as in Fig. 7, a sprocket tooth 20a having curvilinear faces 20b is undercut at the root of the tooth, all as indicated generally at 20c. The undercutting resulted from the former way of manufacturing. With such an undercut tooth 20a in engagement with the forward edge of the sprocket hole 31 of film 30, the groove formed by the undercut 20c will tend to "grab" the edge of the hole 31 and pull the edge of the film down into the corner 20c and hold it in bound or pinched condition during the forward movement of the sprocket. Thus the film edge is pulled out of its normal plane and when the moving force of the sprocket pulls the film, the film tears at the edges of the holes unless the film happens to be particularly flexible.

In the improved structure of the sprocket herein as partially illustrated in Fig. 8, the above noted binding or pinching is eliminated, and the film is held in a proper and desirable position or plane during its contact with the sprocket so that each film edge at the sprocket hole engages the same relative driving point of any tooth and the driving force is conducted to the film without causing binding or pinching.

For uniform motion and travel of the film over the sprocket the forward drive of the sprocket teeth should be accompanied by a uniform sliding of the teeth against the forward edges of the apertures or holes 31. However, with any undercut and consequent grabbing or pinching of the hole edges of the film, the inherent brittleness of the film material is not equal to the tearing strain imposed thereon, and breakage, or cracking, or tearing, or ripping of the film material results. Repetitions of this character or nature generally result in the complete tearing of one or more of the sprocket holes and thereafter stripping of some of the successive sprocket holes, which thereafter requires cutting out of the damaged part and splicing of the films to secure operation of the film through the machine.

By the use of an external, preferably hardened annulus or ring 17 shrunk and supported on the external ring or flange 13 of the sprocket, the film 30 is raised above the roots of the sprocket teeth so that the driving engagement of the film at the sprocket holes by the sprocket teeth occurs in every instance at a median point of uniform curvature on the forward and driving faces of the sprocket teeth. This allows normal film (first run film) to engage each tooth at the same relative driving point. It will be appreciated that in this condition the forward drive by teeth 20 against film 30 will be simultaneously accompanied by smooth passage of the forward or engaging curvilinear faces of the teeth against the film at the sprocket holes and without grabbing or pinching or other effects normally resulting in tearing or destroying the film. This smooth engagement, driving operation, and release of the film holes by the respective sprocket teeth, is of particular and paramount importance in smooth motion-picture film operation, as it promotes the longevity of film by providing optimum and mechanically accurate control and operation of the film with proper support and driving and, at the same time, avoids contact with the photographic and sound sections of the film, thus reducing mechanical wear and abrasion to a minimum. The support afforded by the peripheral engaging surfaces of driving shoulders or rings 17, is ample for various films, and by making the teeth and members 17 of wear-resistant material the abrasion of parts normally occasioned by the continuous travel of a cellulosic film is reduced to an unappreciable degree. It is to be noted, in passing, that cellulosic film materials, generally, have a high abrading quality on metals, and the wearing of parts causes shifting of the film and its parts so that distortion, both of sound and pictures, oftentimes results. This distortion, particularly of sound, is a feature which has to be guarded against most carefully, because the dissonance caused by sound distortion is much more annoying and more readily noticed by the average movie-goer than is picture or optical distortion.

The improvements of the present invention while due in no small part to the structural arrangements of the sprocket members or elements, depend, to a certain extent, upon the method of forming the members. As is indicated immediately above, substantial accuracy in the machine parts used in motion picture cameras and sound camera attachments and printing and projection machines is required to give or secure the desired and acceptable fidelity in reproduction.

In the production of the improved sprocket herein an improved method is employed which eliminates special accuracy except in the cutting of the teeth and the grinding of the shoulder 13 and the inside of ring 17 for shrinkage. In respect to the cutting of the teeth, the improved method herein has given the desired accuracy with the least amount of attention.

The steps required in the forming of the improved sprocket of the present invention will be described. Suitable bar stock is machined to give the desired shape and to form the teeth allowing for grinding and to form the central aperture 15, and is drilled to form the apertures 12a in the drums 12 to assist in obtaining light weight. Thereafter the sprockets are hardened by heating the film drums 12, 13 and 14, and not the hub 11, unless desired for some reason, and thereafter quenching in oil or water. The film drums are preferably heated simultaneously as by gas or acetylene, or otherwise, and then quenched. The teeth, and the drum between the teeth are then ground across 16 to give the root diameter.

In accomplishing the cutting and grinding a suitable cutting or grinding wheel 40 (Fig. 6) is provided with contours that engage and form the teeth as the wheel passes between the teeth. It will be noted that the wheel 40 is provided with portions 41 that cut or grind one side of two different teeth, and that portions 42, shown in section, cut or grind parts of the root spaces between the teeth. It has been found advantageous to have the widths of portions 42 greater than one-half of the distance between any two teeth so that when the wheel or tool 42 cuts or grinds the other part of the root, there will be an overlap thereby preventing a ridge at the bottom of the teeth.

It will be noted by reference to Fig. 3 that special accuracy of the cutting or grinding of the root between the teeth, or the cutting of the lowermost parts of the teeth, is not required, as the film rides on the outside surface of ring 17, while the surface of the root is shown by the dotted lines 43 and the film does not engage those portions.

By employing tools of this nature for cutting and grinding, the teeth are formed accurately and to size and each tooth has a same relative driving point for engagement with the normal film. As the film rides on rings 17 (Figs. 4, 5, and 8), it will be seen that it engages each tooth at a same relative driving point. The teeth are so designed that they allow for the most efficient engagement, driving and pull-off from the sprocket with the least danger of tearing or destruction. Experiments and operation have given good proof of the foregoing statement.

While the cutter or grinder may be constructed to operate at the same time on two teeth, skipping one tooth as shown in Fig. 6, it will be understood that a cutter may be constructed to skip two or more teeth, or be made so that it will cut both sides of a single tooth at the same time. It will be noted that after each passage of the cutter or grinder 40 across the teeth, that the cutter or grinder will be moved to engage the next tooth or teeth depending upon the construction of the cutter or grinder.

After the teeth grinding operations the outer ring seat or annulus 13 is ground on the ends of the sprocket. During these operations a separate hardened ring 17 has been prepared and is now heated and shrunk onto the seat formed by flange or ring 13. On sprockets employing the inside ring 14 grinding or machining may be resorted to for bringing the exterior diameter to the desired shape. The outer surface of ring 17 may be ground at the same time.

Ring 14, inside of the film drum, is ground to a diameter less than that across the outer diameter of the hardened ring 17, and it is usually of a diameter less than the root diameter of the tooth portion, so that as the grinding tool 40 moves across between the teeth it will not cut into ring 14 and create ridges therein. Annular channels or grooves 18 and 19, next to the teeth, are formed. These channels may be formed before hardening, if desired.

The use of hardened, ground sprocket teeth permits substantial and practical accuracy in grinding and performance and insures long wear. The use of the hardened bearing ring 17 not only provides a firm and abrasion-resistant seating for the film, but also, due to its arrangement, on the sprockets, holds the film spaced up on the sprocket teeth so that the teeth are engaged by the film at the proper tooth height,—that is, at points of uniform curvature so as to secure smooth engagement, driving operation, and release of the teeth at the end of their engagement with the film in a manner that eliminates damaging of the film. The spacing of the inner flange 14 from the film, or the omission of such a flange, clears the inside of the film and avoids rubbing or abrading of the sound film track with consequent wearing and distortion. The avoidance of damage to the sound film track and photographic portions of the film are of great importance,—particularly as any and all scratches are optically and phonetically reproduced in the pictures and sound. This is particularly important in connection with any damage of any kind to the sound tracks, as with photoelectric reproduction of abrasions and the like, there is introduced undesired variations into the sound record.

It will be noted by referring to Fig. 8 that the roots of the teeth as indicated by dotted lines 43, are below the exterior diameter of ring 17, thus the film cannot be caught or pinched and torn at the base of the tooth. In addition, this type of construction allows the grinding wheel to cut below its original intended amount without creating any damage. Thus the tolerance or allowed variation from the design may be varied without danger or without creating damage.

It will now be appreciated that there has been provided an improved film sprocket which is inexpensive and quick to manufacture with extreme accuracy, efficient in use and with no parts or protuberances to damage the film. The use of the new sprocket insures long life for itself and for the film, with a minimum of wear and injury. In addition, the use of the sprockets herein insures absolutely faithful phonetic and photographic reproduction of sound films and picture films.

While the description and disclosure herein have been disclosed and particularly pointed to sprockets for use in moving film through apparatus, it will be understood that such improved sprockets have characteristics and value so that they may be employed in different fields of industry.

While certain novel features of the invention have been shown and described and are pointed out in the annexed claims, it will be understood that various omissions, substitutions and changes in the forms and details of the device illustrated and in its operation, may be made by those skilled in the art without departing from the spirit of the invention.

What is claimed is:

1. A sprocket comprising a drum having sprocket teeth, an internal annular shoulder on the sprocket, an external shoulder on the sprocket, both shoulders being spaced from the teeth by annular grooves, and an annulus on the outer shoulder and defining a circumferential groove with the outer edges of the sprocket teeth, the circumference of the annulus being greater than the circumference of the inner shoulder.

2. A sprocket comprising two sets of teeth, an external shoulder on the outside of each set of teeth, a ring mounted on each of said shoulders for supporting a film as it passes over said sprocket, a shallow groove formed in the external surface of said ring and adjacent the teeth, the circumference of said ring being greater than a circumference passing through the roots of said teeth and an annular shoulder on the inside of each set of teeth, the circumference of said ring being slightly greater than the circumference of said annular shoulder.

3. A sprocket comprising a drum having sprocket teeth, each tooth tapering to its outer end, inner shoulders on the drums of smaller diameter than the root circles of said teeth and separated from the teeth by annular grooves, and film-engaging annuli secured on the outside of the drum, the said annuli having outer diameters approximating the median diameters of the sprocket teeth.

4. A motion picture film sprocket comprising a central hollow shaft and integral end drums provided with integral hardened sprocket teeth thereon, integral annular shoulders formed on said drums, said shoulders being of smaller outside diameter than the root circles of the sprocket teeth whereby to permit said teeth to be ground without affecting said shoulders, and hardened annuli mounted on said shoulders.

5. A sprocket as set forth in claim 4 in which said annuli have a greater outside diameter than the root circles of said sprocket teeth.

6. A sprocket as set forth in claim 4 in which said annuli have a greater outside diameter than the root circles of said sprocket teeth and are provided with annular grooves on their outer surfaces adjacent the sprocket teeth.

7. A motion picture film sprocket comprising end drums provided with teeth integral with said drums, an integral annular shoulder extending outwardly from each of said drums, each of said drums being provided with an annular channel at the outside base of the teeth and an annulus secured to each of said shoulders provided with an annular channel adjacent the outside of said teeth.

8. A motion picture film sprocket comprising end drums provided with teeth integral with said drums, an integral annular shoulder extending outwardly from each of said drums, each of said drums being provided with an annular channel at the outside base of the teeth and an annulus secured to each of said shoulders provided with an annular channel adjacent the outside of said teeth, the contacting faces of the teeth and the annulus providing a flush joint.

LOUIS S. FRAPPIER.
ALBERT KINDELMANN.